United States Patent Office 3,655,850
Patented Apr. 11, 1972

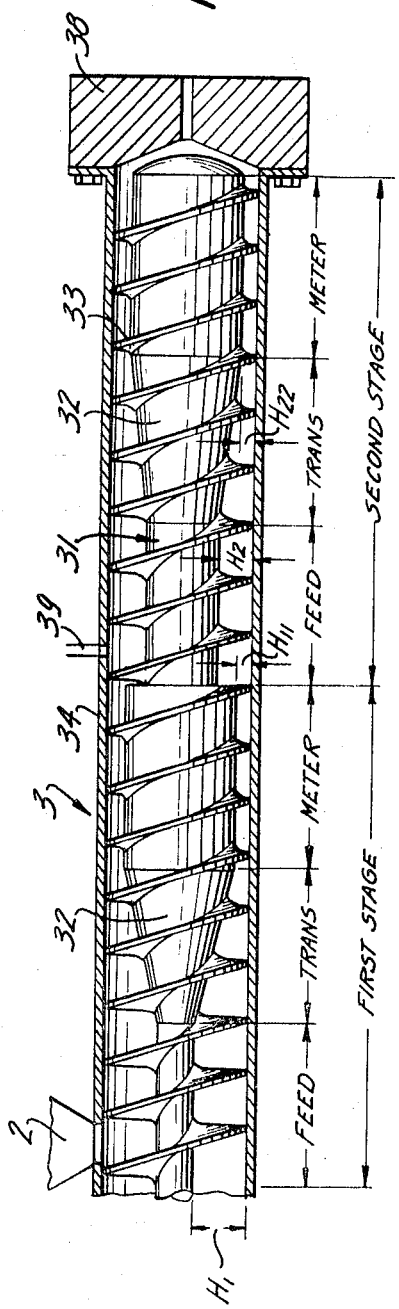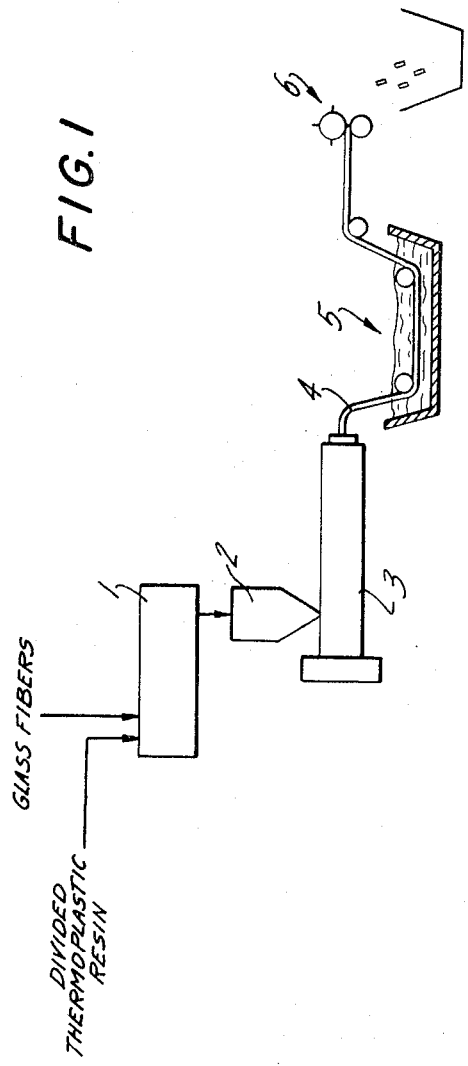

3,655,850
METHOD FOR THE CONTINUOUS PRODUCTION OF GLASS FIBER REINFORCED THERMOPLASTICS
George W. Woodham, Evansville, and James L. Stuart, Boonville, Ind., assignors to Dart Industries, Inc., Los Angeles, Calif.
Filed Oct. 30, 1969, Ser. No. 872,683
Int. Cl. B01j 2/20
U.S. Cl. 264—118
10 Claims

ABSTRACT OF THE DISCLOSURE

A process disclosed for continuously producing glass fiber reinforced thermoplastic compositions by extrusion techniques whereby surging is minimized or substantially eliminated and products having good appearance and uniformity may be obtained. A blended mixture of glass fibers and thermoplastic resin in divided form are fed and processed through an extruder equipped with a multiflight screw which provides for two stages, each stage including a feed zone, transition zone and metering zone and wherein the compression ratio in the first stage is in the range of about 3:1 to 5:1, the compression ratio in the second stage is in the range of about 1.5:1 to about 3.5:1, and the ratio between the flight depth of the screw in the second stage feed zone and the flight depth of the screw in the first stage feed zone is in the range of about 1:1.25 to about 1:2.5. The mixture is continuously extruded under the above conditions, coled to solidification, and subdivided into the desired size. The resulting compositions are particularly suitable for molding operations.

This invention relates to a process for continuously producing glass fiber reinforced thermoplastic compositions which are suitable for extrusion or molding, particularly injection molding. More specifically, the invention relates to an extrusion process for the continuous production of such compositions from thermoplastic particles and glass fibers of relatively short length.

Heretofore, glass fiber reinforced thermoplastic compositions have been produced by extrusion techniques. In these processes glass fibers and thermoplastic resin are fed to an extruder wherein the thermoplastic resin becomes molten and mixed with the glass fibers. The mixture is then extruded and reduced to a size suitable for handling and subsequent molding or extrusion operations. Among the problems associated with these extrusion techniques is that of surging within the extruder. Surging, which involves fluctuations in the flow rate of the resin-glass fiber mass in the extruder, causes the extrudate to be uneven and to separate and break apart at or near the extrusion opening thus interrupting the continuity of production. This characteristic is particularly evident with resin-glass fiber extrudates since the elongation properties of such compositions are relatively low. In addition, it has been troublesome obtaining adequate dispersion of the glass fibers within the resin. Inadequate fiber dispersion results in undesirable products having a multiplicity of fiber ends protruding therefrom and which have significant void areas. The void areas necessarily lower the density of the product and thus lead to additional space requirements for shipping standard quantities of product. Moreover, these undesirable products are susceptible to swelling when contacted by moisture.

In accordance with this invention there is provided an extrusion process for continuously and uniformly producing glass fiber reinforced thermoplastic compositions wherein the above mentioned problems are substantially minimized or eliminated. Briefly, the invention involves forming a physical mixture of glass fibers of relatively short length and thermoplastic resin in solid divided form. The mixture is then fed to an extruder having two stages each of which define a feed zone, a transition zone and a metering zone. The mixture is initially received in the feed zone of first stage and continuously conveyed forward through the extruder by an extruder screw under specific conditions. While in the first stage the mixture is subjected to elevated temperatures and compresison conditions, the compression ratio being in the range of about 3:1 to about 5:1, to substantially melt all of the resin and intimately disperse the glass fibers throughout the molten resin. The mixture then passes from the first stage to the feed zone of the second stage for decompression and venting wherein the flights of the extruder screw in the second stage feed zone are more shallow than the flights of the extruder screw in the first stage feed zone, the ratio between the depth of the screw flights of the second stage feed zone ($H_2$) to the depth of the screw flights of the first stage feed zone ($H_1$) being in the range of 1:1.25 to 1:2.5. In the second stage the resin is maintained in a molten state and the glass fibers are further dispersed therethrough while again subjetcing the mixture to compression conditions, the compression ratio this time being in the range of about 1.5:1 to 3.5:1. Thereafter, the mixture is continuously extruded in a convenient form and solidified following by reduction to the desired size if necessary. The prdouction of glass fiber reinforced thermoplastic compositions in accordance with the above briefly described invention substantially avoids surging problems and provides good dispersion of the glass fibers throughout the resin matrix thus permitting continuous and uniform production of the desired products.

The invention will be described in further detail below wherein other features and advantages will become apparent, especially when taken in conjunction with the accompanying drawing wherein:

FIG. 1 illustrates a schematic diagram of the process of this invention, and

FIG. 2 illustrates a partial cross-sectional view of the specific extruder employed with the invention.

With reference to FIG. 1, a thermoplastic resin in solid divided form and glass fibers of relatively short length is fed to a physical mixing device 1. In the mixing device the resin and glass fibers are intimately mixed in any known. It has been found that a ribbon blender is ideally suited for this operation since the resin and fibers may be well mixed by the gentle tumbling action of the blender in a short period of time. Care should be taken to prevent undue fragmentation of the glass fibers which may cause the glass to "ball-up," i.e. collect in fibrous masses, whereby good mixing is lost and problems may be encountered in feeding such mixtures to the extruder.

Further with regard to the physical mixing operation it is essential that the thermoplastic resin be in a divided form, such as pellets, granules, powders and the like. This not only enables the glass fibers to be more easily dispersed throughout the resin but also permits the resin to be more readily and quickly melted in the extruder. The advantages of this latter aspect will be more apparent from the discussion to follow regarding the extruder and its operation.

With regard to the glass fibers it has been mentioned that the fibers should be of relatively short lengths. It is preferred that the fibers have nominal lengths in the range of ⅛ inch to ½ inch. This permits good physical mixing with the resin in the mixing device 1 and also good dispersion throughout the resin melt as the mixture passes through the extruder. Moreover, if the fibers are too long they will not flow properly through the extruder and may contribute to undesirable surging problems. Conversely, if the fibers are too short the ultimate products may not be provided with the desired degree of reinforcement.

Glass fibers of the desired lengths are available on a commercial basis with diameters ranging from 0.0001 inch to 0.0006 inch. A particularly useful commercial glass fiber is that referred to as chopped roving having a nominal length of about ¼ inch. This chopped roving actually comprises short segments of roving about ¼ inch in length wherein each segment has a plurality of glass filaments loosely held together by a sizing material. The sizings are conventional materials coated on the glass fibers by the glass industry to permit easier handling and processing. Such sizings include, for example, polyvinyl acetate and various silane compounds to name but a few. It is preferred that the glass fibers used in this invention be coated with a sizing since it aids in providing a better bond between the resin and the glass.

Referring again to the drawing and FIG. 1, the phyical mixture of the resin and glass fibers is fed from the mixing device 1 to the fed hopper 2 of an extruder 3. The extruder is essentially of conventional construction with the exception of the extruder screw. The screw is constructed in such a manner that it defines two stages within the extruder each of which include a feed zone, a transition zone and a metering zone in sequence. More particularly, the screw is designed so that the first stage has a compression ratio in the range of about 3:1 to about 5:1, the second stage has a compression ratio in the range of about 1.5:1 to about 3.5:1, and the ratio of the depth of the screw flights in the second stage feed zone ($H_2$) to the depth of the screw flights in the first stage feed zone ($H_1$) is about 1:1.25 to about 1:2.5. Preferably, the first stage compression ratio is in the range of about 3.5:1 to about 4.5:1, the second stage compression ratio is in the range of about 1.5:1 to 3:1, and the $H_2:H_1$ ratio is about 1:1.75 to about 1:2.

All of the above aspects of the invention will be more apparent by referring to FIG. 2 wherein there is shown the barrel portion of extruder 3 in cross-section along with an embodiment of the extruder screw 31 employed in the invention. In particular, the screw 31 comprises a central shaft 32 having a series of screw flights 33 spirally extending along the shaft throughout the length of the extruder barrel 34. The extruder barrel is provided at its forward end with a die plate 38 having suitable extrusion orifices through which the material being processed is ultimately extruded. The screw flights 33 are preferably of constant pitch for simplicity in manufacturing the screw 31. However, the central shaft 32 of the screw varies in diameter along its length thus varying the depth of the screw flights from one position to another along the screw as shown in FIG. 2. It is this variation in diameter in combination with the pitch of the screw flights that defines the two stages and provides for the essential parameters of the invention, namely the compression ratios in each stage and the flight depth ratio between the two feed zones.

It should be understood that while the invention is illustrated and described above in terms of constant flight pitch and certain variations in screw diameter to achieve the essential parameters of the invention a combination of variations in both screw flight pitch and screw diameter may be employed to achieve the same conditions.

Now then, the mixture of glass fibers and thermoplastic resin is received from the feed hopper 2 into the feed zone of the first stage wherein the depth of the screw flights is deepest relative to the remaining zones. From the feed zone the mixture is conveyed through the transition zone of the first stage wherein the depth of the screw flights becomes progressively more shallow thus causing increasing compression of the mixture. The mixture is then conveyed through the metering zone wherein the depth of the screw flights is the shallowest and on to the second stage.

In the first stage the difference in the depth of the screw flights of the feed zone ($H_1$) and the depth of the screw flights in the metering zone ($H_{11}$) is such that a compression ratio in the range of about 3:1 to about 5:1 is obtained. It has been found that lower compression ratios do not provide for sufficient fiber dispersion throughout the resin while at higher compression ratios surging problems arise.

The first stage of the extruder is heated so that the heat in combination with the compression of the mixture as it passes therethrough substantially melts the thermoplastic resin by the time it reaches the second stage. The heat may be supplied to the mixture through the extruder barrel as is conventional by such means as electrical heating elements. It is pointed out, however, that the temperatures applied at the barrel may necessarily be much higher than those temperatures which would normally be employed to melt just the resin alone without the presence of the glass fibers. In other words, the temperature employed in normal extrusion operations of the resin alone would not always be sufficient to melt substantially all of the resin in the first stage of the present invention. The precise temperatures would depend on a variety of factors including the amount of material being processed per unit time, the physical form of the thermoplastic resin (powders melt more quickly than pellets), the void volume of the mixture, etc. For example, using a 6-inch extruder equipped with a suitable screw so as to define the parameters of this invention it may be expected that to process a mixture of polypropylene and 20% by weight of the mixture of glass fibers temperatures must be employed at least about 100° F. above the temperatures normally employed in similarly extruding polypropylene without glass fibers. The precise operating temperatures will be understood and capable of determination by those skilled in the art by merely observing the condition of the mixture as it enters the second stage and making any necessary adjustments to the heating means of the first stage to insure that substantially all of the resin is melted by the time it passes through the first stage.

From the first stage metering zone, wherein the glass fibers and resin melt undergo substantial dispersion, the mixture is conveyed to the second stage wherein decompression is encountered in the feed zone by an increase in the depth of the screw flights. Preferably, the increase in depth of the screw flights is sudden so that decompression takes place as rapidly as possible. However, it is also permissible to have a more gradual increase in depth of the screw flights. It is essential to the invention that the flight depth in the second stage feed zone ($H_2$) be less than the flight depth in the first stage feed zone ($H_1$) and particularly that the ratio of the two flight depths ($H_2:H_1$) be in the range of about 1:1.25 to about 1:2.5. In this manner, the mixture undergoes decompression and venting of any entrained volatiles and gases through vent 39 while at the same time substantially avoiding any surging.

From the feed zone of the second stage the decompression mixture undergoes recompression in a transition zone wherein the depth of the screw flights gradually decreases to a depth ($H_{22}$) which then remains substantially constant throughout a final metering zone. The difference between the screw flight depths of the feed zone and the metering zone is such that the compression ratio during recompression is in the range of about 1.5:1 to 3.5:1. As a result surging is further avoided and the glass fibers are further dispersed within the resin melt.

The thermoplastic resin is received in the second stage in a substantially melted state and is maintained in a molten state throughout the second stage. It is pointed out that due to the frictional heat generated between the resin and the glass fibers as the mixture is conveyed through the second stage cooling may be necessary to prevent such high temperatures of the resin that its viscosity becomes so low that the resulting extrudate loses its integrity. This cooling condition is quite unlike the extrusion of an unreinforced resin wherein heat is generally necessary throughout the full length of the extruder.

The resulting mixture of well dispersed glass fibers in the resin melt is then extruded through the die plate 38 in a suitable form 4, referring back to FIG. 1, such as a sheet, strip, strand or the like. The extrudate is solidified by passing it through a conventional water bath 5 or other suitable cooling means followed by being fed to a conventional cutter device 6 whereby it is reduced to a desired size for subsequent molding operations.

It is emphasized that, with the above described invention, mixtures of thermoplastic resins containing up to about 50% by weight glass fibers, and preferably between about 10% and 50%, may be continuously and uniformly formed into compositions wherein the glass fibers are well dispersed throughout the resin while substantially avoiding the usually attendant surging problems. A particularly desirable composition prepared in accordance with this invention contains about 20% to 40% by weight glass fibers. It is also pointed out that by employing glass fibers having nominal lengths in the range of about ⅛ inch to ½ inch in the above described invention reinforced compositions are obtained wherein a majority of the fibers have such lengths that the compositions are highly suitable for molding or extrusion operations. For example, when employing commercially available glass fibers having a nominal length of about ¼ inch there is produced in accordance with the invention reinforced compositions wherein the majority of fibers have lengths in the range of about 0.010 inch to 0.030 inch and up to about 0.07 inch. Such compositions have have highly desirable physical properties.

Thermoplastic resins in general may be employed in producing compositions in accordance with this invention. Included among these resins are polyolefins, particularly polyethylene, polypropylene and copolymers thereof; polystyrene; styrene-acrylonitrile polymers, ABS type polymers (polymers based on acrylonitrile-butadiene-styrene); nylon; polyphenylene oxides; polyacetals; polysulfones; polyesters; polycarbonates; polyurethanes; cellulose esters; acrylic polymers; polyvinyl chlorides; and various thermoplastic elastomers such as those based on styrene and butadiene or ethylene and propylene.

In addition to the thermoplastic resin and glass fibers, the compositions may also be provided with various other additives which can be added to the mixture prior to being fed to the extrusion apparatus or while it is passing therethrough, depending on the type of additive. Included among these additives are dyes, pigments, stabilizers, antioxidants, talc, asbestos, molybdenum disulfide, teflon particles, lubricants, slip agents, anti-block agents, and the like.

EXAMPLE 1

To further illustrate the invention the following example is presented:

70 pounds of a commercially available polyethylene resin in pellet form (Alathone 7050) were placed in a standard ribbon blender along with about 0.05 pound of calcium stearate as a processing aid. The ingredients were then blended for about one minute after which 30 pounds of commercially available chopped glass fibers having a nominal length of ¼ inch (Type 832 OCF) were added and the total mixture blended for about 30 to 45 seconds taking care to avoid excessive blending which would result in undue fragmentation of the glass. The resulting blended mixture of glass fibers and resin was then transferred to a feed hopper of a 3.5 inch, 30:1 $L/D$ extruder containing a two-stage screw of constant flight pitch (3.5 inches) having the following specifications:

| Zone | | Number of flights | Flight depth (inch) |
|---|---|---|---|
| Stage: | | | |
| First | Feed ($H_1$) | 6 | 0.400 |
|  | Transition | 4 | |
|  | Metering ($H_{11}$) | 4 | 0.116 |
| Second | Feed ($H_2$) | 6 | 0.200 |
|  | Transition | 3 | |
|  | Metering ($H_{22}$) | 7 | 0.114 |

The compression ratio of the first stage was about 3.4:1, the compression ratio of the second stage was about 1.8:1 and the ratio of flight depths between feed zones ($H_2/H_1$) was about 1:2. The heat controls on the extruder were set at feed zone (1st)—370° F., transition zone (1st)—350° F., metering zone (1st)—450° F., feed zone (2nd)—250° F., transition zone (2nd)— 270° F., and metering zone (2nd)—440° F.

With the extruder vented at the second stage feed zone and operating under the above conditions at 85 r.p.m., the glass fiber-resin mixture is gravity fed from the hopper into the feed zone of the first stage of the extruder. The mixture was passed through the extruder and extruded into strands through a 12-hole die, each hole being about ⅛ inch in diameter. As the mixture passed through the extruder visual observation at the vent indicated that the resin was substantially melted as the mixture passed from the first stage to the second stage. The pressure at the die was a constant 500 p.s.i. The extruded strands were then solidified by passing through a water bath maintained at a temperature of about 75–100° F. and cut into pellets about ⅛ inch in length by a rotary drum cutter.

During the process no surging was observed and a continuous extrudate was obtained without separations. The extrudate visually had good integrity as it was extruded and the final pellets had good appearance, that is, were not fibrous, and had good fiber distribution.

EXAMPLE 2

For comparison with the invention as represented by Example 1 the following test was carried out employing the same procedures as outlined in Example 1 with the exceptions as indicated.

A dry blend was formed with a ribbon blender of 70 pounds of commercially available polyethylene pellets (Alathone 7050), 30 pounds of commercially available chopped glass fibers (Type 885 OCF) having a nominal length of ¼ inch, 0.7 pound of pellets of polyethylene containing high concentrations of carbon black (pigment), and 0.05 pound of calcium stearate as a processing aid. This blend was fed to the hopper of 3.5 inch, 30:1 $L/D$ two-stage extruder similar to that in Example 1 except that the screw, having a constant flight pitch of 3.5 inches, provided a first stage compression ratio of about 4.3:1, a second stage compression ratio of about 2.9:1 and a ratio of flight depths between the second stage feed zone ($H_2/H_1$) of about 1:1. The temperatures on the extruder barrel were set as follows: feed zone (1st)—350° F.; transition zone (1st)—400° F.; metering zone (1st)— 380° F.; feed zone (2nd)—300° F.; transition zone (2nd)—330° F.; and metering zone (2nd)—420° F.

The blended mixture waws gravity fed to the extruder and passed therethrough using the same 12-hole die plate. The resin was obserbed to be substantially molten at the vent at the feed zone of the second stage. Constant surging was present in attempting to continuously extrude the mixture in the form of strands. The surging caused interruptions in the strands preventing operation on a smooth continuous basis.

Attempts were made to overcome the surging problems by varying the temperature settings on the extruder barrel as follows: feed zone (1st), 350°–500° F.; transition zone (1st), 400–500° F.; metering zone (1st), 300–500° F.; feed zone (2nd), 300–350° F.; transition zone (2nd), 330–380° F.; and metering zone (2nd), 420–450° F. The surging problems could not be overcome with these operational changes.

EXAMPLE 3

This is another example of the invention following a similar procedure as outlined in Example 1 but wherein the blended mixture was formed with 80 pounds of commercially available polypropylene pellets (Type 11-H-10, El-Rex), 20 pounds of commercially available chopped glass fibers having a nominal length of ¼ inch (Type 832, OCF) and 0.05 pound calcium stearate as a processing aid.

The blend was fed to a 3.5 inch, 24:1 $L/D$ two-stage extruder similarly as in Example 1 and wherein the temperatures were set as follows: feed zone (1st)—400° F.; transition zone (1st)—420° F.; metering zone (1st)—370° F.; feed zone (2nd)—320° F.; metering zone (2nd)—340° F.; and wherein the screw was of constant flight pitch and had the following specifications:

| Stage: | Zone | Number of flights | Flight depth (inch) |
|---|---|---|---|
| First | Feed ($H_1$) | 4 | 0.590 |
|  | Transition | 6 |  |
|  | Metering ($H_{11}$) | 4 | 0.140 |
| Second | Feed ($H_2$) | 4 | 0.350 |
|  | Transition | 2 |  |
|  | Metering ($H_{22}$) | 4 | 0.210 |

The compression ratio in the first stage was about 4.2:1, the compression ratio in the second stage was about 1.7:1, and the ratio of flight depths ($H_2/H_1$) of the second stage metering zone to the first stage metering zone was about 1:1.7.

In processing the mixture through the extruder it was visually observed at the vent that substantially all of the resin was in the melt phase. The extrusion process was carried out on a continuous basis with no evidence of surging. The extruded strands had good appearance and integrity and were solidified and cut into pellets about ⅛ inch in length. Visual examination of the pellets indicated good fiber distribution; there were no fibrous pellets.

EXAMPLE 4

In another example of the invention a mixture was prepared of 870 pounds of commercially available ABS pellets (Cycolac DH 4051R), 130 pounds of commercially available chopped glass fibers having a nominal length of ¼ inch (PPG-6532), and 0.5 pound calcium stearate as a processing aid. Prior to blending the ABS was thoroughly dried to eliminate any moisture. Using a similar procedure as in Example 1 the mixture was fed to a 6-inch 24:1 $L/D$ two-stage extruder wherein the temperature controls were set as follows: feed zone (1st)—520° F.; transition zone (1st)—600° F.; metering zone (1st)—520° F.; feed zone (2nd)—350° F.; transition zone (2nd)—370° F.; and metering zone (2nd)—530° F. The extruder screw was of constant flight pitch and had the following specifications:

| Stage: | Zone | Number of flights | Flight depth (inch) |
|---|---|---|---|
| First | Feed ($H_1$) | 5 | 1.000 |
|  | Transition | 3 |  |
|  | Metering ($H_{11}$) | 4 | 0.250 |
| Second | Feed ($H_2$) | 3 | 0.600 |
|  | Transition | 3 |  |
|  | Metering ($H_{22}$) | 6 | 0.333 |

The compression ratio in the first stage was 4.0:1, the compression ratio in the second stage was 1.8:1, and the ratio of flight depths between the second stage feed zone and the first stage feed zone was 1:1.67.

The extruder in this example was equipped with a twenty-nine hole die, each hole being about ⅛ inch in diameter. The mixture was processed through the extruder wherein at the second stage feed zone vent the resin appeared substantially melted. No surging was observed ad continuous strands were extruded having good integrity. The strands were cooled and cut into pellets about ⅛ inch in length which exhibited good appearance and were not fibrous.

Thus having described the invention in detail it will be understood by those skilled in the art that certain variations and modifications may be made without departing from the spirit and scope of the invention as defined herein and in the appended claims.

We claim:
1. A process for the continuous production of glass fiber reinforced thermoplastic compositions comprising
   (A) continuously feeding a mixture of thermoplastic resin in divided form and up to 50 wt. percent of glass fibers to the first stage feed zone of a two-stage extrusion region wherein each stage sequentially includes a feed zone, a transition zone and a metering zone;
   (B) continuously conveying the mixture through the first stage and second stage with a multi-flight extruder screw while simultaneously
      (1) in the first stage, subjecting the mixture to increased compression up to a compression ratio in the range of about 3:1 to about 5:1 and sufficient heat to substantially melt all of the thermoplastic resin, and dispersing the glass fibers throughout the resin; and
      (2) in the second stage, maintaining the thermoplastic resin in the melt phase while decompressing and venting the mixture as received from the first stage in the feed zone wherein the ratio of the flight depth of the extruder screw in the second stage feed zone to the flight depth of the extruder screw in the first stage feed zone is in the range of about 1:1.25 to about 1:2.5 followed by again subjecting the mixture to compression up to a compression ratio in the range of about 1.5:1 to about 3.5:1 and dispersing the glass fibers further throughout the resin; and
   (C) continuously extruding the mixture from the extrusion region, solidifying the extruded mixture and subdividing it into pieces.

2. A process according to claim 1 wherein the glass fibers have nominal lengths in the range of about ⅛ inch to about ½ inch.

3. A process according to claim 1 wherein the glass fibers are chopped roving segments having nominal lengths in the range of about ⅛ inch to about ½ inch.

4. A process according to claim 1 wherein the glass fibers are chopped roving segments having a nominal length of about ¼ inch.

5. A process according to claim 2 wherein the glass fibers have a sizing thereon.

6. A process according to claim 1 wherein the compression in the first stage is increased up to a compression ratio in the range of about 3.5:1 to about 4.5:1, the compression in the second stage is increased up to a compression ratio in the range of about 1.5:1 to about 3:1, and the ratio of flight depth of the extruder screw in the second stage feed zone to the flight depth of the extruder screw in the first stage feed zone is in the range of about 1:1.75 to about 1:2.

7. A process according to claim 1 wherein the thermoplastic resin is in pellet of powder form.

8. A process according to claim 7 wherein the thermoplastic resin is a polyolefin, polyester, polyurethane, polystyrene, copolymers of styrene and acrylonitrile, ABS, polysulfone, polyphenylene oxide, polyacetal, nylon, or cellulose ester.

9. A process according to claim 1 wherein the mixture is extruded in the form of at least one strand which, after solidification, is cut into pellet form.

10. A process according to claim 1 wherein the mixture is extruded in the form of a sheet or ribbon which, after solidification is comminuted into granular form.

References Cited

UNITED STATES PATENTS

| | | | |
|---|---|---|---|
| 2,370,952 | 3/1945 | Gordon | 264—142 |
| 2,833,750 | 5/1958 | Vickers | 264—141 |
| 3,025,565 | 3/1962 | Doriat et al. | 264—142 |
| 3,164,563 | 1/1965 | Maxwell et al. | 264—143 |
| 3,453,356 | 7/1969 | Kent et al. | 264—143 |

ROBERT F. WHITE, Primary Examiner

J. R. HALL, Assistant Examiner

U.S. Cl. X.R.

264—122, 141